UNITED STATES PATENT OFFICE.

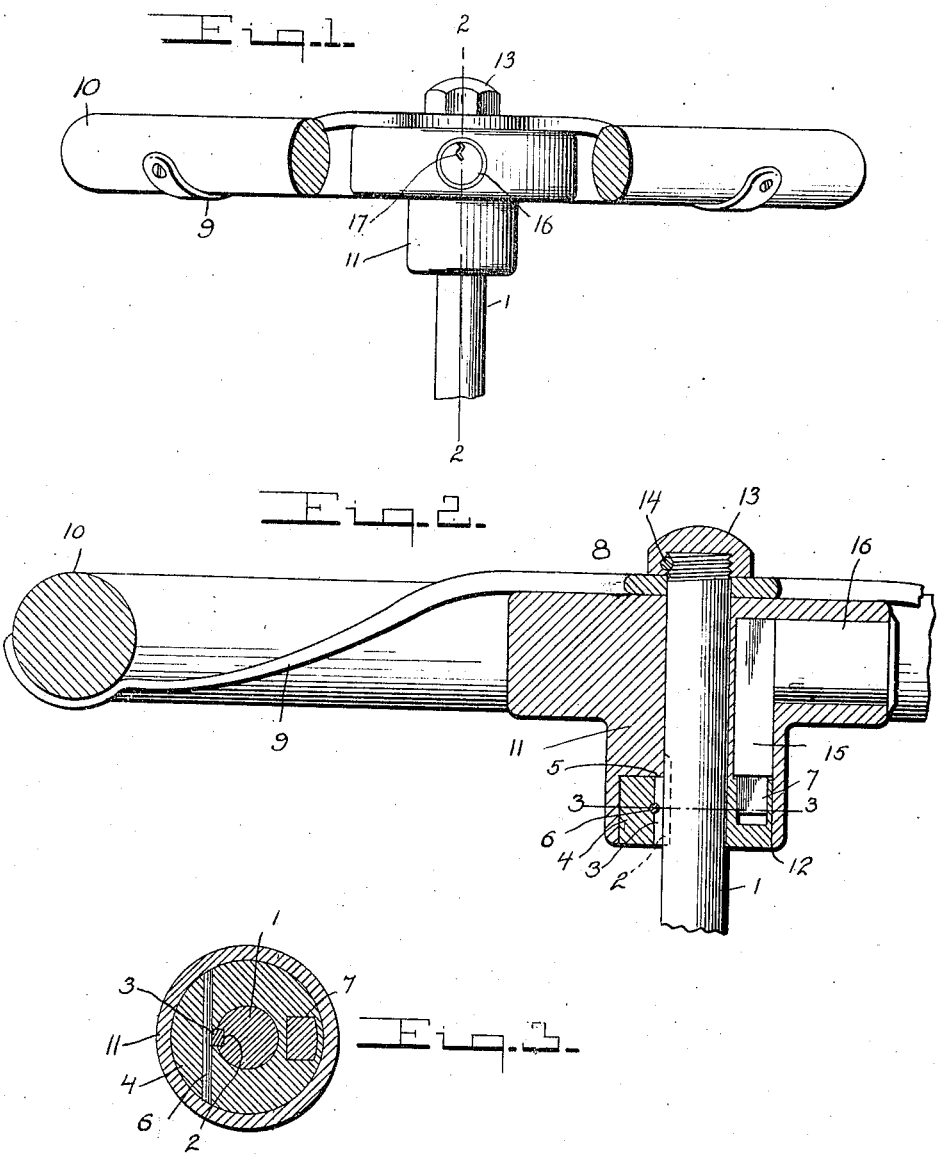

JAMES D. KING, OF ELLENSBURG, WASHINGTON.

AUTOMOBILE-LOCKING DEVICE.

1,271,173. Specification of Letters Patent. Patented July 2, 1918.

Application filed May 2, 1917. Serial No. 165,949.

*To all whom it may concern:*

Be it known that I, JAMES D. KING, a citizen of the United States, residing at Ellensburg, in the county of Kittitas and State of Washington, have invented certain new and useful Improvements in Automobile-Locking Devices, of which the following is a specification.

This invention relates to improvements for insuring the safety of motor vehicles when left standing and more particularly to improvements of this character applicable to the steering wheel of a vehicle.

The object of the invention is to provide simple and efficient means whereby the steering wheel may be rendered inoperative and thereby prevent the unauthorized use of the machine.

Another object is to so construct and connect the steering wheel with the steering post that it may, at the will of the driver, be disconnected from the steering post and rendered rotatable thereon without in any way controlling the movement of the post.

Another object is to provide means for locking the steering wheel either in loose or fixed position relatively to its post.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of a steering wheel and the upper portion of the steering post equipped with this invention and with a portion of the wheel broken out, Fig. 2 is a vertical section taken on the line 2—2 of Fig. 1, and Fig. 3 is a horizontal section taken on the line 3—3 of Fig. 2.

In the embodiment illustrated, a steering post 1 is shown having a key-way 2 in one side thereof near its upper end and which is designed to receive a key 3 which locks a collar 4 in engagement with the post to adapt it to rotate therewith. This collar 4 also has a key-way 5 to receive the key 3 by which it is locked to the post. An auxiliary locking device for this collar is shown in the form of a pin 6 which has a drive fit transversely through the collar and key as is shown clearly in Fig. 2 to prevent all possibility of the collar being detached from the key. This collar 4 has a socket 7 extending inwardly from its upper or inner face as shown in Fig. 2 and which is designed to form a keeper for a locking bolt presently to be described.

Mounted on this steering post 1 is a steering wheel 8 of ordinary construction having the usual spider arms 9 supporting an ordinary rim 10. The hub 11 of this wheel is recessed at its lower end as shown at 12 to fit over and rotatably engage the collar 4 forming a protective hood therefor. This wheel is held in position on the post by means of the usual nut 13 which is threaded on the upper end of said post and is here shown secured against removal or against being screwed downward into tightening engagement with the wheel by means of a pin 14 driven transversely through the nut and the post.

A bolt 15 is mounted to slide longitudinally in the hub 11 of the wheel 8 as is shown clearly in Figs. 2 and 3 and is designed normally to enter the keeper or socket 7 in the collar 4 whereby said wheel is rigidly connected with the steering post through said collar and adapted to rotate therewith so that on the turning of said wheel, motion will be imparted to the post in the usual manner. When the bolt 15 is retracted, the driving wheel will turn loosely on the post without in any way effecting the movement of the post, consequently should an unauthorized person attempt to drive the vehicle when the wheel is in this position, no steering of the vehicle could be effected.

The means for operating this locking bolt 15 preferably constitutes a pin lock indicated at 16 and which may be of the ordinary construction controlled by an ordinary key. This lock preferably is constructed with a double set of tumblers so that the locking bar or bolt 15 may be locked in either projected or retracted position according to whether it is desired to connect the steering wheel with the post 1 or disconnect it therefrom, the latter being desirable when the driver desires to leave his vehicle standing.

It will thus be seen that when the driver leaves his vehicle and wishes to insure its safety against unauthorized driving, all that is necessary is for him to insert his key, not shown, in the opening 17 of the lock 16 and retract bolt 15 and lock it in retracted position, and when in this position, the wheel 8 will turn freely on the post 1 without effecting any movement thereof. The driver then, of course, removes the key and takes it with him and on again entering the vehicle inserts it in the key hole 17 and projects the bolt 15 into locking engagement with the collar 4 and the key may either be left in the lock or removed as desired, and the turning of the wheel 8 will operate in the usual manner for steering the vehicle.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim,—

The combination with a steering post having a steering wheel carried thereby, of a collar closely fitting and keyed to said post with a socket in its inner end, said wheel having a hub with an annular recess in its inner end communicating with the bore of the hub to encompass said collar and turn loosely thereon, said hub extending over the full length of said collar and completely housing one end and the periphery thereof, the other end of said collar being flush with the lower end of the hub, said hub having a longitudinal passage extending inwardly from and communicating with said recess and adapted to register with the socket in said collar when the parts are assembled, a bolt movable longitudinally in said passage to move into and out of said collar socket for connecting and disconnecting the wheel from the post, and key controlled means for projecting or retracting said bolt and for locking it in either position.

In testimony whereof I affix my signature in presence of two witnesses.

JAMES D. KING.

Witnesses:
R. W. KING,
E. BEN JOHNSON.